March 9, 1954 — C. A. DERKSEN — 2,671,674

BUMPER ATTACHED TRAILER HITCH

Filed July 28, 1952

Inventor
Cornelius A. Derksen
By
Walter C. Boggs
AGENT

Patented Mar. 9, 1954

2,671,674

UNITED STATES PATENT OFFICE 2,671,674

BUMPER ATTACHED TRAILER HITCH

Cornelius A. Derksen, St. Vital, Manitoba, Canada

Application July 28, 1952, Serial No. 301,309

1 Claim. (Cl. 280—491)

The invention relates to means for coupling a trailer to the rear part of an automobile. The present trend of automobile body design is to blend the rear bumper into the body lines without intervening space so that neither chains nor ropes can be passed around the rear bumper for hauling purposes. Accordingly when trailing devices are to be hauled, a special draft connection has to be provided.

It is recognized that the most practical draft method for this purpose is by the use of a ball type hitch which may support the front of the trailer and also guide the same when turning corners. But, the ball construction must be rugged to stand up to such usage and must also be supported from the strongest part of the automobile, namely, the chassis. To be of use, it must project rearwardly of the back bumper so as to be clear for the swinging of the trailer in turning corners. On the other hand, a hitch in this position is unsightly against the beauty lines of the automobile, when not in use, and in a rear collision, the ball may cause expensive damage which might not occur from bumper contact.

The principal object of the present invention is to provide a construction which can be removably attached to the rear part of the chassis of an automobile and be out of sight, but will support an exposed strong rugged draft connection at the rear of the bumper for trailer hauling purposes.

A further important object of the invention is to design the device such, that the draft connection will be rigidly supported when in use but can be released for movement into a concealed position in front of the rear bumper when not in use, and therefore cannot collide with exterior objects.

Still further objects of the invention are to construct the device in a simple, cheap and durable manner, quickly attachable to standard makes of automobiles, easily changed from exposed to concealed position, or vice versa, and will stand up under all conditions for many years of useful service.

With the above important and other minor objects in view, which will become more apparent as the description proceeds, the invention consists essentially in the arrangement and construction of parts hereinafter more particularly described, reference being had to the accompanying drawings in which.

In the drawings like characters of reference indicate corresponding parts in the several figures.

Figure 1:
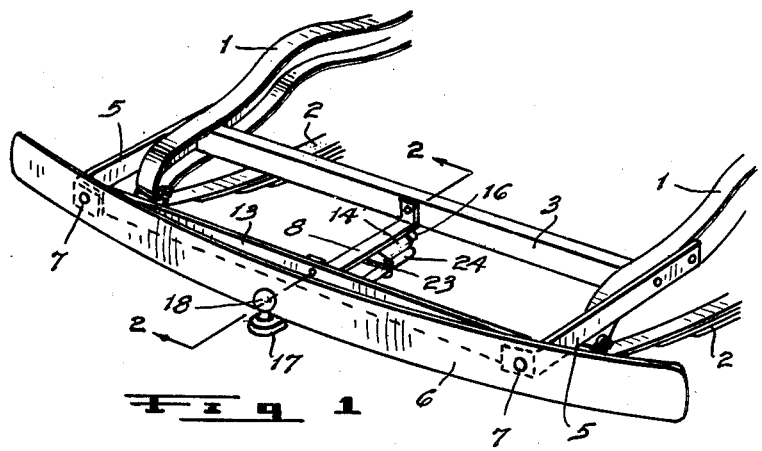
Figure 1 is a perspective view of the rear part of the chassis of an automobile, including the bumper, and showing the invention installed thereon with the draft connection in the exposed position.
Figure 2:
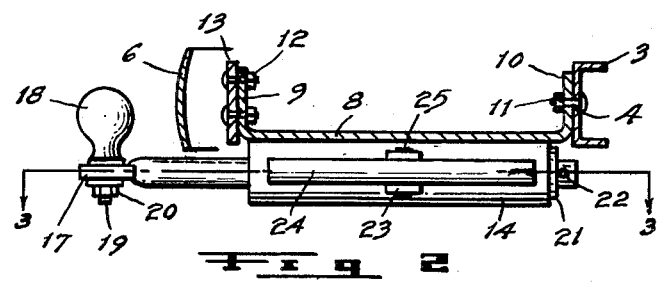
Figure 2 is an enlarged vertical longitudinal section taken on the line 2—2, Figure 1.

The rear parts of the side members of an automobile chassis are indicated at 1 in Figure 1. These members are supported on the usual automobile springs 2 and are connected at the rear by a cross member 3 of channel iron cross section. In nearly all automobiles, this rear cross member is provided with a central hole 4 which apparently is not used for any purpose. Side bars 5 project rearwardly from the sides of the chassis to support a rear cross bumper 6, the extending ends of the bars 5 being bent and bolted thereto, as indicated at 7. In some automobiles, a single U-shaped bar (not shown) is substituted for the bars 5, the ends being fastened to the chassis and the central part being bolted to and positioned parallel with the front of the rear bumper, as a reinforcement. These U-shaped bars are also provided with a central hole which apparently is not used.

The present invention comprises a strap bar 8 having the ends thereof bent upwardly, as shown at 9 and 10. The end 10 is secured by a bolt 11 to the cross bar 3, using the hole 4 therein. The opposite end 9 of the strap bar is secured by bolts 12 to a cross bar 13 which is supported at opposite ends by the bolts 7 of the bumper. This cross bar 13 is only used when the U-shaped bar above mentioned is not provided. When the U-shaped bar is on the automobile, the end 9 of the strap bar is bolted to it by using the central hole mentioned therein.

Figure 3:
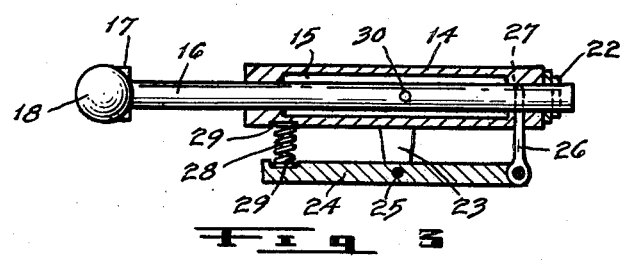
Figure 3 is a horizontal sectional view taken on the line 3—3, Figure 2.

A cylindrical casting 14 is positioned longitudinally below the strap bar 8 and welded thereto as a unit therewith. The central part of this casting is hollow, as indicated at 15 in Figure 3. The ends are centrally machined to present end bearings for the telescopic reception of a draft bar or shaft 16 which passes therethrough. The rear end of this draft bar projects from the casting and terminates in a flattened portion 17, having a central hole (not shown) threaded therethrough. A hitch connection in the shape of a ball 18 is provided with a theaded shank 19 which threads through the hole and is then secured by a lock nut 20. The front end of the bar 16 carries a washer 21 backed by a pin 22 which passes therethrough. When the draft bar is end shifted through the casting 14, the flattened portion 17 stops it in one direction and the washer 21 stops it in the other direction.

A pair of lugs 23 extend from one side of the casting 14 in spaced parallel and vertical relation with each other. A round rod 24 is positioned in spaced relation with the side of the casting 14 and is centrally pivoted at 25 to and between the lugs. One end of the rod is pivotally connected to one end of a pin 26 which passes through one of the end bearings of the casting 14 and enters a hole 27 in the draft bar 16 to lock same against movement and with the ball 18 in a vertical position behind the bumper. The opposite end of the rod 24 is pressed away from the casting 14 by a compression coil spring 28, the ends of which are received in depressions 29 of both the casting and the rod. A hole 30 is also drilled through the draft bar 16 at right angles to the hole 27 and spaced therefrom toward the ball 18.

It will be seen that, if the rod 24 is pressed in toward the casting 14 against the resilience of the spring 28, the pin 26 will be withdrawn from the hole 27 in the draft bar to free same. The draft bar can then be rotated to bring the ball 18 horizontal and below the bumper so that the bar can be pushed ahead and the ball will pass under the bumper to a stored position thereinfront. When the flattened part 17 contacts the casting 14, the hole 30 will be aligned with the pin 26 for entrance thereof as the pressure on the rod 24 is released, and so again lock the rod. In the same way, if the rod 24 is again pressed, the pin will withdraw from the hole 30 and the ball can be brought back to the exposed position in the reverse manner and the pin again locked in the hole 27.

Figure 4:
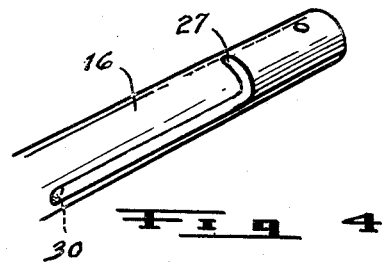
Figure 4 is an enlarged partial perspective view of the draft bar and showing the guiding groove.

From the above disclosure it will be seen that the ball 18 is ruggedly supported from the chassis and in the position shown in the drawings, a trailer socket can be secured thereto for draft connection, while if the trailer has no socket, a rope or chain may be connected from the ball thereto for hauling purposes. When not in use, the ball can be quickly stored out of sight as above described and be clear of interference with exterior objects. The pin 26 can be guided from one locking hole to the other by providing a groove 31 on the draft bar between the holes, as shown in Figure 4. It will be noticed that this groove is of an L-shape to permit rotation and end shifting of the draft bar as required for the purpose, and at the end of either movement, the correct hole will be aligned to receive the pin.

What I claim as my invention is:

In an automobile having a chassis and a rear bumper; a trailer hitch for said automobile, comprising: a tubing positioned longitudinally of said automobile, between and releasably supported from said chassis and said bumper; a draft bar telescopically and rotatably received through said tubing in a position below said bumper, and such that the rear end thereof extends thereunder and therepast; a draft connection, in the shape of a ball, releasably secured on the side of said projecting end and positioned vertically behind said bumper; an arm pivoted from the side of said tubing; a pin having one end pivoted to one end of said arm and the other end of said pin extending through the wall of said tubing and entering a hole in said draft bar, to lock said draft bar in a position to hold said draft connection vertical; resilient means between said tubing and the opposite end of said arm, to hold said pin in said locked position; said arm manually pressable, against said resilience, to release said pin from said draft bar locked position; said draft bar rotatable, when said pin is released, to swing said draft connection to a horizontal position, below said bumper; said draft bar slidable through said tubing, in said rotated position, to pass said draft connection under said bumper to a stored position thereinfront; a secondary hole through said draft bar for receiving said pin, to lock said draft bar in said connection stored position, when said manual pressure is released; and a slot on said draft bar, connecting said holes, and rideable by said pin, to guide said holes into alignment with said pin, in the movement of said draft bar.

CORNELIUS A. DERKSEN.

References Cited in the file of this patent

UNITED STATES PATENTS

| Number | Name | Date |
|---|---|---|
| 945,683 | Beydler et al. | Jan. 4, 1910 |
| 1,154,505 | Gentle | Sept. 21, 1915 |
| 2,544,185 | Sargent | Mar. 6, 1951 |